No. 862,647. PATENTED AUG. 6, 1907.
P. J. MACDONALD.
BLOCK.
APPLICATION FILED FEB. 20, 1907.
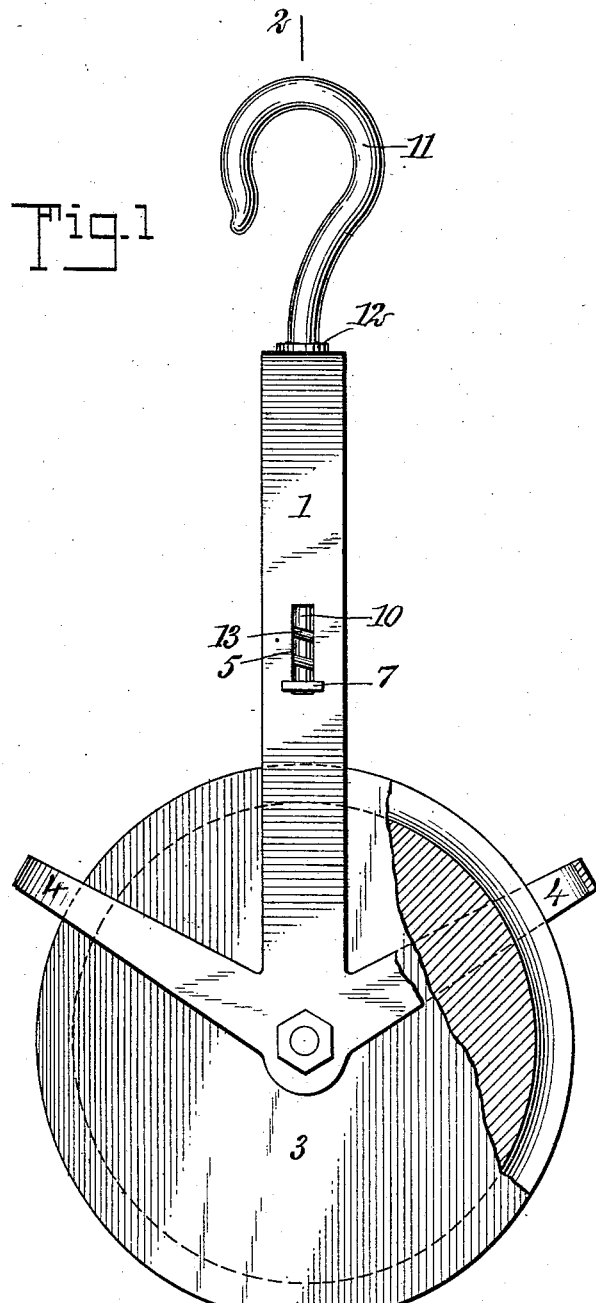
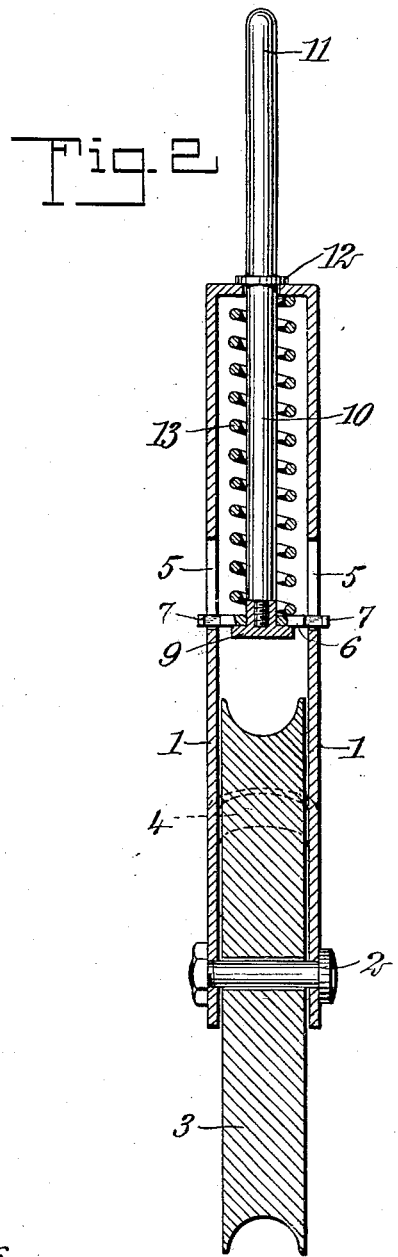
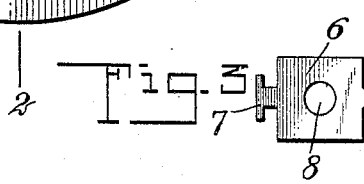
WITNESSES
INVENTOR
Peter J. Macdonald
BY
ATTORNEYS

UNITED STATES PATENT OFFICE.

PETER J. MACDONALD, OF BANGOR, MAINE.

BLOCK.

No. 862,647. Specification of Letters Patent. Patented Aug. 6, 1907.

Application filed February 20, 1907. Serial No. 358,351.

*To all whom it may concern:*

Be it known that I, PETER J. MACDONALD, a citizen of the United States, and a resident of Bangor, in the county of Penobscot and State of Maine, have invented a new and Improved Block, of which the following is a full, clear, and exact description.

This invention has in view the provision of a light, simple and easily constructed block which will relieve the load of sudden jerks and shock as are incident in hoisting, drawing and landing loads with the usual hoisting block.

I accomplish the above objects by my invention, one embodiment of which is hereinafter disclosed, by forming a yielding connection between the block and the means for suspending or holding it in fixed position.

Reference is to be had to the accompanying drawings forming a part of this specification, in which similar characters of reference indicate corresponding parts in all the figures.

Figure 1 is a side elevation of the block partly in section; Fig. 2 is a central, vertical section on the line 2—2 of Fig. 1, showing the hook for suspending the block in full lines, and Fig. 3 is a plan of the plate forming a detail of construction.

The block as preferably constructed, comprises straps 1, 1 made of a single bar of iron bent upon itself, as clearly shown in Fig. 2. In the lower ends of the straps 1 is journaled on a pin or bolt 2, a groove wheel or sheave 3 of the usual or other preferred construction, said sheave being preferably provided with keepers 4 arranged at the opposite sides of the straps 1 and formed integral therewith, as illustrated in Fig. 1.

Just above the sheave 3 the straps 1 are provided with opposite slots 5, in which is slidably mounted a plate 6 shown in detail in Fig. 3, said plate being constructed at opposite sides with T-shaped heads 7, which form guides when the plate is in operative position, and prevents the straps from spreading or approaching each other. In the center of the plate 6 an opening 8 is formed for receiving a headed nut 9, the latter being in threaded engagement with the lower reduced and threaded end of the stem 10 of a hook 11. The hook 11, which is for the purpose of suspending or holding the block in fixed relation is swiveled and passes through an opening in the connecting portion of the straps 1, where it is provided with a shoulder 12 acting to limit its inward movement. Interposed between the connecting portion of the straps 1 and the plate 6, is a helical spring 13 loosely surrounding the stem 10 and acting to normally retain the plate 6 in contact with the head of the nut 9 and the hook drawn inwardly.

It is obvious in assembling the block that the plate 6 must be turned on edge in order to pass it through the slots 5 of the straps 1, thereafter turning it to a horizontal position when the heads 7 and the straps are in register. With the plate in this position, the spring 13 can be inserted and seated in place and the stem 10 run therethrough as also through the plate 6 and threaded to the nut 9.

The block in use is suspended or held in fixed relation by the hook 11, and when thus disposed any sudden jerk or shock brought on the line passing about the sheave 3 will be absorbed by the spring 13, which is limited in its range of movement by the length of the slots in the straps. The length of these slots is such that the plate 6 will be arrested in its upward movement when the pull on the sheave is almost sufficient to fully compress the spring 13 and thus prevent injury to the spring by excessive strains.

Although I have shown and described my invention as preferably constructed, I nevertheless, regard the precise embodiment as not material provided the essential characteristics are employed as pointed out in the annexed claims.

Having thus described my invention I claim as new and desire to secure by Letters Patent:

1. A block comprising straps connected together at their upper ends, a sheave journaled between said straps, means for suspending said straps having a stem passing through an opening in the connecting portion of the straps, a plate carried at the lower end of said stem, connecting the straps together and a spring interposed between the connecting portion of the straps and said plate.

2. A block comprising straps connected together at their upper ends, a sheave journaled between said straps, means for suspending the straps having a stem passing through an opening in the connecting portion of said straps, a plate having T-shaped heads guided in slots in the straps and carried by said stem, and a spring interposed between the connecting portion of the straps and said plate.

3. A block comprising straps connected together at their upper ends, a sheave journaled between said straps, means for suspending the straps having a stem passing through an opening in the connecting portion of the straps, a shoulder on said suspending means to limit the inward movement of the stem, a plate having T-shaped heads slidable in slots in the straps, a headed nut passing through an opening in the plate in threaded engagement with said stem, and a spring interposed between the connecting portion of said straps and said plate.

4. A block comprising straps connected together at their upper ends, a wheel journaled between said straps but otherwise immovable with respect thereto, means for suspending said straps slidably through the connecting portion thereof, means carried by said suspending means connecting the straps together, and yielding means interposed between said last-named means and the connecting portion of the straps.

In testimony whereof I have signed my name to this specification in the presence of two subscribing witnesses.

PETER J. MACDONALD.

Witnesses:
TROTT R. KING,
T. A. A. BURNHAM.